United States Patent
Foitzik et al.

(10) Patent No.: US 9,308,901 B2
(45) Date of Patent: Apr. 12, 2016

(54) METHOD FOR SETTING A HYDRAULIC VEHICLE BRAKE

(71) Applicants: Bertram Foitzik, Ilsfeld (DE); Otmar Bussmann, Abstatt (DE); Matthias Kistner, Bretzfeld (DE)

(72) Inventors: Bertram Foitzik, Ilsfeld (DE); Otmar Bussmann, Abstatt (DE); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 14 days.

(21) Appl. No.: 14/283,930

(22) Filed: May 21, 2014

(65) Prior Publication Data

US 2014/0345986 A1    Nov. 27, 2014

(30) Foreign Application Priority Data

May 21, 2013   (DE) .......................... 10 2013 209 353

(51) Int. Cl.
| | |
|---|---|
| *B60T 7/12* | (2006.01) |
| *B60T 13/58* | (2006.01) |
| *B60T 13/74* | (2006.01) |
| *B60T 17/22* | (2006.01) |

(52) U.S. Cl.
CPC . *B60T 7/12* (2013.01); *B60T 13/58* (2013.01); *B60T 13/588* (2013.01); *B60T 13/741* (2013.01); *B60T 17/221* (2013.01)

(58) Field of Classification Search
CPC ........... B60T 7/12; B60T 13/58; B60T 17/22; B60T 8/17; B60T 8/171; B60T 8/172
USPC ......... 188/1.11 E, 1.11 L, 72.3; 303/3, 15, 20
See application file for complete search history.

(56) References Cited

U.S. PATENT DOCUMENTS

| | | | | |
|---|---|---|---|---|
| 2,071,636 | A * | 2/1937 | La Brie ..................... | 188/140 R |
| 3,977,732 | A * | 8/1976 | Grosseau .................... | 303/6.01 |
| 2003/0062228 | A1* | 4/2003 | Ichinose et al. ............. | 188/72.3 |
| 2011/0042171 | A1* | 2/2011 | Knechtges ................. | 188/106 F |
| 2014/0015310 | A1* | 1/2014 | Hanzawa et al. ................. | 303/3 |
| 2014/0151164 | A1* | 6/2014 | Yokoyama ................... | 188/72.3 |
| 2015/0145321 | A1* | 5/2015 | Yuasa et al. ...................... | 303/3 |

FOREIGN PATENT DOCUMENTS

| | | |
|---|---|---|
| DE | 10361042 | 5/2005 |
| DE | 10 2008 024 019 | 11/2009 |

* cited by examiner

*Primary Examiner* — Christopher Schwartz
(74) *Attorney, Agent, or Firm* — Kenyon & Kenyon LLP

(57) ABSTRACT

A method for operating a vehicle brake having a brake servo unit and a parking brake actuator. In the case of a failure of the brake servo unit, the distance between brake linings of the vehicle brake and brake disk is reduced by actuating the parking brake actuator.

9 Claims, 2 Drawing Sheets

METHOD FOR SETTING A HYDRAULIC VEHICLE BRAKE

FIELD OF THE INVENTION

The present invention relates to a method for setting a hydraulic vehicle brake, which is equipped with a brake servo unit.

BACKGROUND INFORMATION

Hydraulic braking systems are known in which the brake force applied by the driver to the brake pedal is transformed via a hydraulic brake cylinder and a brake servo unit into a hydraulic brake pressure, with the aid of which brake linings are applied to a brake disk. In the case of a failure of the brake servo unit, for example, a hydraulic pump, the brake boost is only available via the brake cylinder. In this connection, a hydraulic dead volume must initially be delivered before the brake force is built up in order to achieve a significant braking effect.

Furthermore, parking brakes are known in vehicles, which have an electric brake motor which, when actuated, pushes a brake piston, which is the carrier of a brake lining, against the brake disk. Such a parking brake is described, for example, in Germen Patent No. 103 61 042.

SUMMARY

An object of the present invention is to improve the braking behavior of a hydraulic vehicle brake in the case of a failure of the brake servo unit using simple measures.

The method according to the present invention relates to the operation of a hydraulic vehicle brake in a motor vehicle, the vehicle brake including the braking system for decelerating the vehicle wheels via an actuation of the brake pedal. The vehicle brake has a brake servo unit, for example, a hydraulic pump, for generating an increased hydraulic pressure in a hydraulic accumulator for supporting the brake force generation. The vehicle brake also has a parking brake or parking function, in which a braking or parking force is generated which holds the vehicle at a standstill via a parking brake actuator.

If a partial or complete failure of the brake servo unit is detected, in the method according to the present invention, the parking brake actuator is actuated to reduce the distance between the brake linings of the vehicle brake and the brake disk in at least one wheel brake unit. The parking brake actuator acts upon the same wheel brake unit as the hydraulic vehicle brake. In a normal braking operation for decelerating the vehicle, the hydraulic brake pressure applies a brake piston in the wheel brake unit, which is the carrier of a brake lining, against the brake disk axially. The parking brake actuator, via which the parking brake is implemented, also acts upon the brake piston for holding the vehicle at a standstill and thus presses the brake lining against the brake disk.

In the case of partial or complete failure of the brake servo unit, the parking brake actuator is actuated automatically to reduce the distance between the brake lining and the brake disk. This results in a linkage between the parking brake function and the normal brake function for decelerating the vehicle with the objective of reducing the clearance in the wheel brake unit between the brake lining and the brake disk. When the parking brake actuator is actuated, only the clearance is reduced with the objective of being able to carry out the braking operation more rapidly and at higher efficiency in the case of a subsequent normal braking operation triggered by an actuation of the brake pedal by the driver, or automatically by a driver assist function. Due to the reduced clearance, the hydraulic dead volume is reduced accordingly, which normally must be delivered during the normal braking operation, until the brake lining contacts the brake disk. The reduction or elimination of the hydraulic dead volume implements the braking request more immediately when the driver actuates the brake pedal due to the reduced hydraulic volume uptake in the braking system. This also has the advantage that a master brake cylinder of smaller size having smaller, hydraulically effective surfaces is used.

The parking brake actuator may be actuated for reducing the clearance during travel.

The parking brake actuator is, for example, an electric brake motor of an electric parking brake. The brake motor acts on the brake piston and displaces it in the direction of the brake disk.

The distance between the brake linings and the brake disk may be reduced until the brake linings are in contact with the brake disk. However, to prevent the brake linings from rubbing on the brake disk when no driver brake request is present, it may be advantageous to actuate the parking brake actuator in the opposite direction after contact is achieved to move the brake linings away from the brake disk again to a limited extent. The displacement movement in the opposite direction is, however, smaller than the displacement movement carried out immediately before in the direction of the brake disk, in order to ensure that the overall distance between the brake lining and the brake disk has been reduced.

The reduced distance is advantageously retained for the duration of the partial or complete failure of the brake servo unit. As soon as the partial or complete failure is detected, the parking brake actuator is actuated independently or automatically to reduce the clearance. The reduced distance between the brake lining and brake disk is retained.

The method according to the present invention is carried out in the case of a complete failure and in the case of a partial failure of the brake servo unit, if the reduction of the brake force boost exceeds a minimum. If the reduction of the boost is below a threshold value, it may, however, be advantageous to omit the actuation according to the present invention of the parking brake actuator for reducing the clearance.

According to another advantageous embodiment, the adjustment of the brake piston and thus simultaneously the reduction of the clearance takes place by actuating the parking brake actuator in a force-controlled or path-controlled manner. In this case, the distance covered by a control element of the parking brake actuator is ascertained by sensors or determined from a measured variable of the distance covered, the control element being displaced by a defined amount. In a force-controlled displacement, the force via which the brake lining is applied to the brake disk is advantageously ascertained by sensors. In one embodiment of the parking brake actuator as an electric brake motor, the force is ascertained, for example, by measuring the absorbed current in the brake motor, which rises steeply when the brake lining is applied to the brake disk. After such a brake force rise has been detected, it may be advantageous, as described above, to move the parking brake actuator back slightly in the opposite direction to avoid a contact of the brake lining on the brake disk and a friction caused by this, as long as no driver brake request is present.

The method according to the present invention for operating the vehicle brake takes place in a regulating or control unit, which may be an integral part of the vehicle brake or the parking brake.

DETAILED DESCRIPTION

Figure 1:
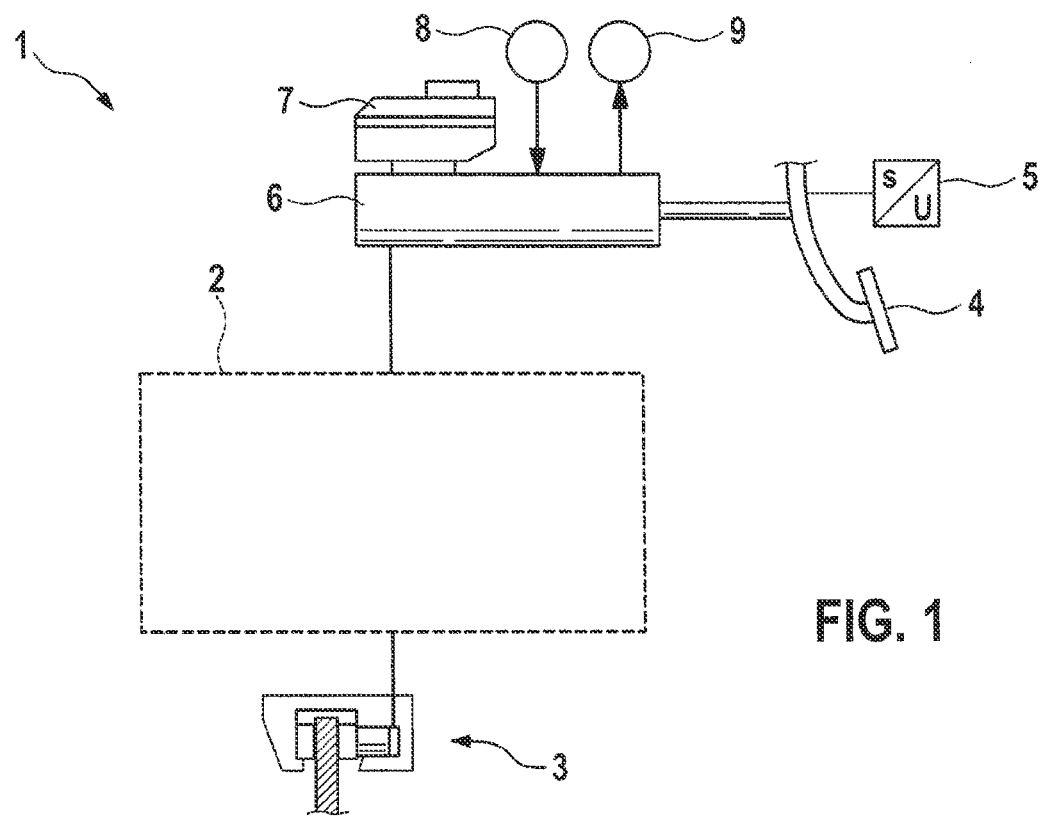
FIG. 1 shows a schematic diagram of a hydraulic vehicle brake in a motor vehicle.

Identical components are provided with the same reference numerals in the figures.

FIG. 1 shows a hydraulic vehicle brake 1 having a brake circuit 2, which is shown only schematically, via which a wheel brake unit 3 is to be actuated for decelerating the vehicle. Brake circuit 2 is hydraulically connected to a master brake cylinder 6, which is connected to a brake fluid reservoir 7. Master brake cylinder 6 is actuated by the driver via brake pedal 4, the pedal travel of which is ascertained by a pedal travel sensor 5. Master brake cylinder 6 is connected to a hydraulic brake servo unit 8, which includes a hydraulic pump and a hydraulic accumulator. Master brake cylinder 6 is also connected to a compensation tank 9. The brake force or brake pressure generated by the driver and boosted in master brake cylinder 6 is transferred to wheel brake unit 3 assigned to a vehicle wheel via brake circuit 2.

Figure 2:
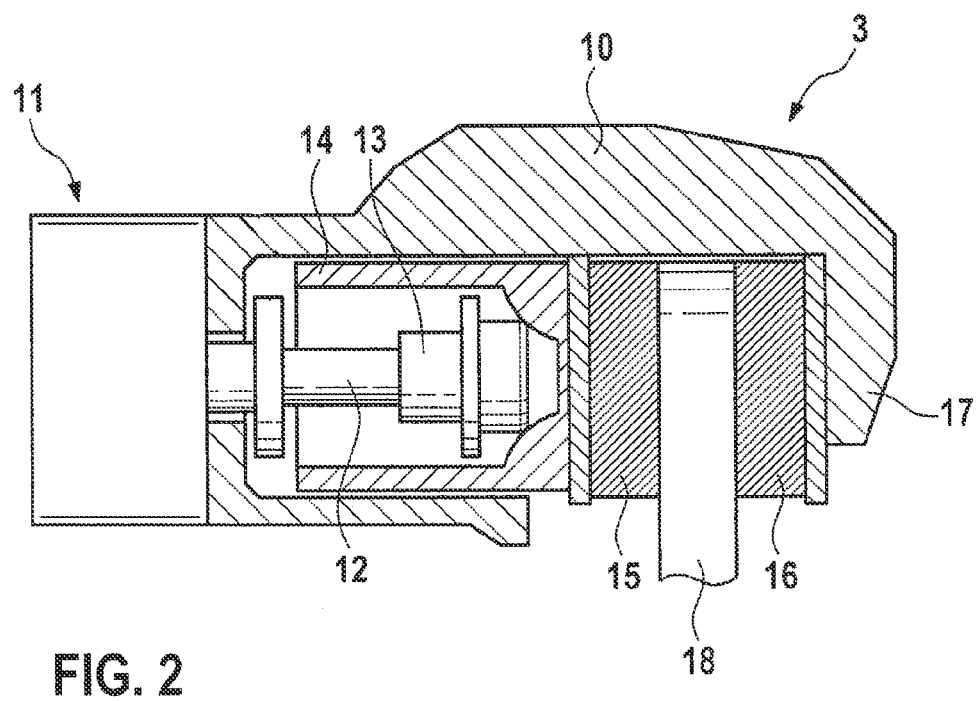
FIG. 2 shows a section through a wheel brake unit of the vehicle brake, which is additionally used as a parking brake, and has an electric brake motor.

As is apparent from FIG. 2, wheel brake unit 3 includes a brake caliper 10 having a caliper unit 17 which reaches over a brake disk 18. A brake lining 15 is situated on a brake piston 14, the brake lining being pushed axially against a face of brake disk 18. Brake piston 14 is acted upon by the hydraulic fluid of the brake circuit. Another brake lining 16 which is held stationary on caliper unit 17 is situated on the opposite side of brake disk 18.

To implement a parking brake function, via which the vehicle is held at a standstill (parking brake), wheel brake unit 3 is equipped with an electric brake motor 11, which rotatably drives a spindle 12, on which a spindle component 13 designed as a spindle nut is rotatably supported.

When spindle 12 is rotated, spindle component 13 is displaced axially, which moves within brake piston 14, which is a carrier of brake lining 15. In order to generate a clamping force which holds the vehicle in place, brake motor 11 is driven until a brake force is generated on brake disk 18 via brake piston 14 and brake linings 15 and 16, which corresponds to a required minimum brake force. The clamping force generated by brake motor 11 may, for example, be ascertained based on the current profile of the brake motor. As soon as the power consumption increases, brake linings 15, 16 are applied to brake disk 18 and exert a clamping force.

Figure 3:
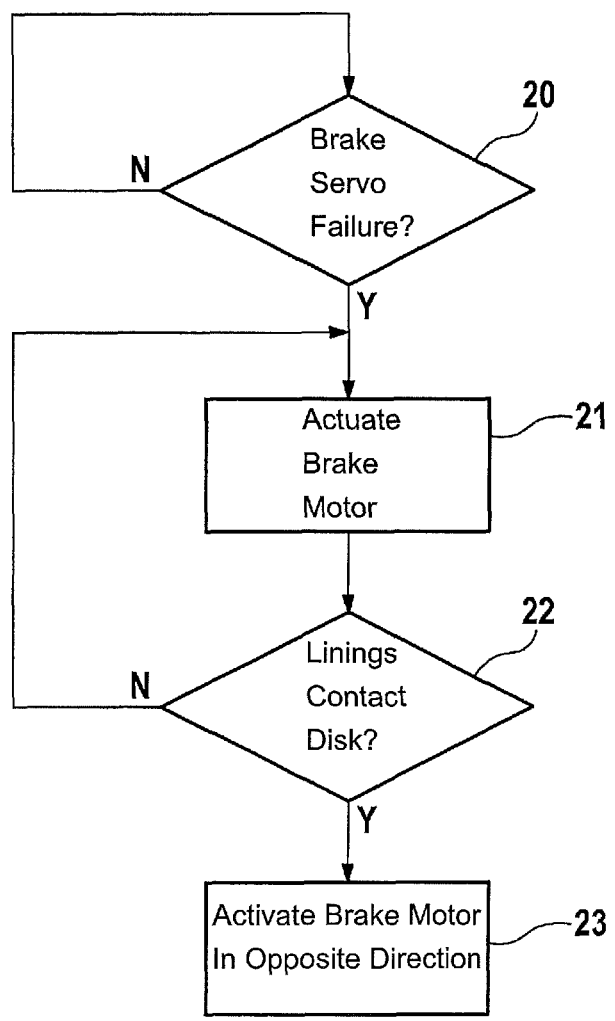
FIG. 3 shows a flow chart having the method steps for operating the vehicle brake in the case of a failure of the brake servo unit.

FIG. 3 shows a flow chart including method steps for operating the vehicle brake in the case of a failure of the brake servo unit. In a first method step 20, it is checked at regular intervals whether the brake servo unit has partially or completely failed. As long as this is not the case, i.e., the brake servo unit is working properly, the vehicle brake is in its normal operating mode and is able to generate the required brake force without limitations. In this case, the no branch ("N"), is followed for returning to the beginning of method step 10 and passes through the query in step 20, again at regular intervals.

However, if the query in step 20 shows that a failure of the brake servo unit is present, the yes branch ("Y") is followed for proceeding to next method step 21, according to which the electric brake motor, to which the parking brake function is assigned, is actuated. This reduces the clearance, i.e., the distance between the brake linings and the brake disk in the wheel brake unit.

In subsequent method step 22, it is queried whether the brake linings are already in contact with the brake disk. This may be ascertained, for example, using the current profile of the electric brake motor. If the current profile increases significantly, this indicates a contact of the brake lining on the brake disk. If an increase in the motor current or the clamping force has still not taken place in the query according to method step 22, the no branch is followed for returning to method step 21 and the clamping operation via the electrical braking operation is continued. If, however, the query in step 22 indicates that a significant increase is taking place in the motor current or in the clamping force, the method is continued to next method step 23.

In step 23, the electric brake motor is activated in the opposite direction, so that the brake linings are removed from the brake disk again and a frictional contact between the brake linings and the brake disk is avoided. However, the reset is only carried out until the brake linings are at only a small axial distance from the brake disk.

The brake linings remain in this position directly adjoining the brake disk, in which the clearance is reduced to a minimum. When the vehicle brake is actuated, the hydraulic brake pressure acts on the brake piston and pushes it in the direction of the brake disk for generating a desired brake force. Since the clearance is reduced to a minimum, accordingly only a reduced hydraulic volume must be delivered by the driver when actuating the brake pedal.

What is claimed is:

1. A method for operating a hydraulic vehicle brake which is equipped with a brake servo unit including a hydraulic pump for generating a brake force applied on a wheel brake unit in response to pedal actuation, a parking brake function being additionally provided by a parking brake actuator, the method comprising:
    in the case of one of a partial failure and a complete failure of the brake servo unit, reducing a separation distance between brake linings of the wheel brake unit and a brake disk to an adjusted non-zero separation distance by actuating the parking brake actuator.

2. The method as recited in claim 1, wherein the parking brake actuator includes an electric brake motor.

3. The method as recited in claim 2, wherein a contact of the brake linings with the brake disk is inferred from a current profile of the electric brake motor.

4. The method as recited in claim 1, wherein the separation distance is reduced between the brake linings and the brake disk by actuating the parking brake actuator in a path-controlled manner.

5. The method as recited in claim 1, wherein the separation distance between the brake linings and the brake disk is reduced by actuating the parking brake actuator in a force-controlled manner.

6. The method as recited in claim 1, further comprising retaining the adjusted non-zero separation distance between the brake linings and the brake disk for a period of the one of the partial failure and the complete failure of the brake servo unit.

7. The method as recited in claim 1, wherein for reducing the separation distance, the brake linings are initially displaced until the brake linings contact the brake disk, and after contact is achieved with the brake disk, the brake linings are moved away again from the brake disk to a limited extent in an opposite direction by actuating the parking brake actuator.

8. A regulating or control unit for implementing a method for operating a hydraulic vehicle brake which is equipped with a brake servo unit including a hydraulic pump for generating a brake force applied on a wheel brake unit in response to pedal actuation, a parking brake function being additionally provided by a parking brake actuator, comprising:
- means for reducing, in the case of one of a partial failure and a complete failure of the brake servo unit, a separation distance between brake linings of the wheel brake unit and a brake disk to an adjusted non-zero separation distance by actuating the parking brake actuator.

9. A vehicle brake system in a vehicle, comprising:
- a regulating or control unit for implementing a method for operating a hydraulic vehicle brake which is equipped with a brake servo unit including a hydraulic pump for generating a brake force applied on a wheel brake unit in response to pedal actuation, a parking brake function being additionally provided by a parking brake actuator, the regulating or control unit including:
  - means for reducing, in the case of one of a partial failure and a complete failure of the brake servo unit, a separation distance between brake linings of the wheel brake unit and a brake disk to an adjusted non-zero separation distance by actuating the parking brake actuator.

* * * * *